(12) United States Patent
Lin et al.

(10) Patent No.: US 10,228,290 B2
(45) Date of Patent: Mar. 12, 2019

(54) SYSTEMS AND METHODS FOR WIRELESS TEMPERATURE SENSING

(71) Applicant: Board of Regents, The University of Texas System, Austin, TX (US)

(72) Inventors: Yirong Lin, El Paso, TX (US); Norman D. Love, El Paso, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 17 days.

(21) Appl. No.: 15/485,494

(22) Filed: Apr. 12, 2017

(65) Prior Publication Data
US 2017/0299439 A1    Oct. 19, 2017

Related U.S. Application Data

(60) Provisional application No. 62/322,207, filed on Apr. 13, 2016.

(51) Int. Cl.
*G01J 5/34* (2006.01)
*G01J 5/02* (2006.01)

(52) U.S. Cl.
CPC .................. *G01J 5/34* (2013.01); *G01J 5/025* (2013.01)

(58) Field of Classification Search
CPC ..................................... G01J 5/34; G01J 5/025
See application file for complete search history.

(56) References Cited

U.S. PATENT DOCUMENTS

| | | | |
|---|---|---|---|
| 3,952,276 A | 4/1976 | Walch et al. | |
| 4,138,655 A | 2/1979 | Nakano et al. | |
| 4,365,229 A | 12/1982 | Tokarz | |
| 4,942,620 A | 7/1990 | Nevill, Jr. | |
| 5,430,428 A | 7/1995 | Gerblinger et al. | |
| 5,871,375 A | 2/1999 | Muzslay | |
| 6,634,212 B2 | 10/2003 | Moos et al. | |

(Continued)

FOREIGN PATENT DOCUMENTS

| | | | | |
|---|---|---|---|---|
| DE | 2754823 A1 | * | 6/1979 | ............... G06G 7/16 |
| JP | 05325002 A | * | 12/1993 | |
| JP | 05325002 A | * | 12/1993 | |

OTHER PUBLICATIONS

Batra, A. K. et al., Pyroelectric Materials Infrared Detectors, Particle Accelerators, and Energy Harvesters (2013) Society of Photo-Optical Instrumentation Engineers, Bellingham, WA, 200 pages.

(Continued)

*Primary Examiner* — Michael C Bryant
(74) *Attorney, Agent, or Firm* — Yee & Associates, P.C.

(57) ABSTRACT

Wireless temperature sensing systems and methods include an active sensor for determining temperature parameters in harsh environments, such as in very high temperature conditions, and wireless conveyance of the detected parameters. In an example embodiment, a pyroelectric element can generate a voltage when subjected to a temperature change. A coil is electrically coupled to the pyroelectric element and configured to generate a magnetic field in response to a current induced by the voltage generated by the pyroelectric element. A pickup is electromagnetically coupled with and detects the magnetic field generated by the coil, and the pickup is configured to provide an output corresponding to the detected magnetic field.

17 Claims, 5 Drawing Sheets

(56) References Cited

U.S. PATENT DOCUMENTS

| | | | |
|---|---|---|---|
| 6,648,208 | B2 | 11/2003 | Tsay et al. |
| 7,106,167 | B2 | 9/2006 | Parsons |
| 7,740,403 | B2 | 6/2010 | Irrgang et al. |
| 8,176,803 | B1 | 5/2012 | Willett et al. |
| 8,661,923 | B1 | 3/2014 | Willett et al. |
| 9,222,842 | B2 | 12/2015 | Sun et al. |
| 9,329,148 | B2 | 5/2016 | Lei et al. |
| 9,464,556 | B2 | 10/2016 | Niemann et al. |
| 9,464,941 | B2 | 10/2016 | Niemann et al. |
| 9,482,755 | B2 | 11/2016 | Cramer et al. |
| 9,543,964 | B2 | 1/2017 | Iwasa |
| 2013/0077222 | A1 | 3/2013 | Sleven |
| 2014/0023109 | A1 | 1/2014 | Ballandras |
| 2014/0331778 | A1 | 11/2014 | Flewitt et al. |
| 2017/0016773 | A1 | 1/2017 | Arai et al. |

OTHER PUBLICATIONS

Byer, R. L. et al., Pyroelectric Coefficient Direct Measurement Technique and Application to a NSEC Response Time Detector, Ferroelectrics (1972) 3:333-338.

Chynoweth, A. G., Dynamic Method for Measuring the Pyroelectric Effect with Special Reference to Barium Titnate, Journal of Applied Physics (1956) 27(1):78-84.

Cuadras, A. et al., Thermal energy harvesting through pyroelectricity, Sensors and Actuators A: Physical (2010) 158:132.-139.

Dias, C. et al., Measurement of the pyroelectric coefficient in composites using a temperature-modulated excitiation, J. Phys, D.: Appl. Phys. (1993) 26:106-110.

Franco, A. et al., The future challenges for "clean coal technologies": Joining efficiency increase and pollutant emission control, Energy (2009) 34:348-354.

Hossain, A. et al., Pyroelectric Detectors and Their Applications, IEEE Transactions on Industry Applications (1991) 27(5):824-829.

Ivill, M. et al., Method and Characterization of Pyroelectric Coefficients for Determining Material Figures of Merit for Infrared (IR) Detectors, Army Research Laboratory (2013) ARL-TR-6758, December, 20 pages.

Karim, H. et al. Feasibility study of thermal energy harvesting using lead free pyroelectrics, Smart Materials and Structures (2016) 25: 055022, 8 pages.

Lang, S. B. et al., Method for the Measurement of the Pyroelectric Coefficient, dc Dielectric Constant, and Volume Resistivity of a Polar Material, Review of Scientific Instruments (1965) 36(7):929-932.

Lang, S. B. et al., Pyroelectric Thermometer for Use at Low Temperatures, Review of Scientific Instruments (1969) 40(2):274-284.

Newsome, Jr., R. W. et al., Measurement of the pyroelectric coefficient of poly(vinylidene fluoride) down to 3 K, Physical Review B (1997) 55(11):7264-7271.

Sarker, M. R. H. et al., Temperature measurements using a lithium niobate (LiNbO3) pyroelectric ceramic, Measurement (2015) 75:104-110.

Sarker, M. R. H. et al., A Lithium Niobate High-Temperature Sensor for Energy System Applications, IEEE Sensors Journal (2016) 16(15):5883-5888.

Savage, A., Pyroelectricity and Spontaneous Polarization in LiNbO3, Journal of Applied Physics (1966) 37(8):3071-3072.

Simhony, M. et al., Measurement of the pyroelectric coefficient and permittivity from the pyroelectric response to step radiation signals in ferroelectrics, Appl. Phys. Lett. (1972) 21(8):375-377.

Smith, B. et al., Simultaneous Electrothermal Test Method for Pyroelectric Microsensors, Transactions of the ASME (2007) 129:504-511.

Suli, E. et al, An Introduction to Numerical Analysis (2003) Cambridge University Press, Cambridge, United Kingdom, 444 pages.

Tsai, C. F. et al., Pyroelectric infrared sensor-based thermometer for monitoring indoor objects, Review of Scientific Instruments (2003) 74(12):5267-5273.

Wang, Y. et al., A Passive Wireless Temperature Sensor for Harsh Environment Applications, Sensors (2008) 8:7982-7995.

Yvon, P. et al., Structural materials challenges for advanced reactor systems, Journal of Nuclear Materials (2009) 385:217-222.

Zappi, P. et al., Tracking Motion Direction and Distance with Pyroelectric IR Sensors, IEEE Sensors Journal (2010) 10(9):1486-1494.

Bartholomaus et al., "Pyroelectric coefficients of LiNbO3 crystals of different compositions," physica status solidi (a) 142, No. 1 (1994): K55-K57. (Best available copy provided).

\* cited by examiner

SYSTEMS AND METHODS FOR WIRELESS TEMPERATURE SENSING

CROSS-REFERENCE TO PROVISIONAL APPLICATION

This nonprovisional patent application claims priority to and the benefit under 35 U.S.C. § 119(e) of U.S. Provisional Patent Application Ser. No. 62/322,207, filed on Apr. 13, 2016, entitled "Systems and Methods for Wireless Temperature Sensing," which is hereby incorporated herein by reference in its entirety.

STATEMENT REGARDING FEDERALLY SPONSORED RESEARCH

This invention was made with government support by the Department of Energy (DE-FE0011235). The government has certain rights in the invention.

TECHNICAL FIELD

Embodiments are generally related to techniques for sensing and conveying temperature parameters of systems, components, machinery, and equipment used for various applications. Embodiments further relate to techniques for wirelessly sensing and conveying conditions and parameters pertaining to temperature.

BACKGROUND

Conventional techniques for gathering information about operational conditions or parameters (e.g., temperature, temperature differences, exhaust gas concentrations) of commercial systems generally entail the use of wired or cabled devices. Such devices present certain limitations on their applicability, particularly when dealing with harsh environments where extreme conditions pose a detrimental effect to the materials comprising the components resulting in sustainability and reliability issues. Thus, a need remains for improved techniques to gather and convey operational system information and parameters in a manner less vulnerable to the above-mentioned drawbacks.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved system and method for sensing and conveying temperature parameters of systems, components, machinery, and equipment used for various applications.

It is another aspect of the disclosed embodiments to provide for a system and system for wirelessly sensing and conveying conditions and parameters pertaining to temperature.

It is another aspect of the disclosed embodiments to provide for a wireless temperature sensor system that includes a pyroelectric element that generates a voltage when subjected to a temperature change.

The aforementioned aspects and other objectives and advantages can now be achieved as described herein. In an example embodiment, a wireless temperature sensor system can include a pyroelectric element configured to generate a voltage when subjected to a temperature change; a coil electrically coupled to the pyroelectric element and configured to generate a magnetic field in response to a current induced by the voltage generated by the pyroelectric element; and a pickup configured to electromagnetically couple with and detect the magnetic field generated by the coil, wherein the pickup is configured to provide an output corresponding to the detected magnetic field.

In some example embodiments, the coil can be configured with a magnetic metal core. In another example, a processor can be configured to correlate the output corresponding to the detected magnetic field to a temperature parameter indicative of a temperature of the pyroelectric element. In yet another example embodiment, the pyroelectric element can be a Lithium Niobate ($LiNbO_3$) pyroelectric ceramic. In general, the voltage generated by the pyroelectric element is proportional to its exposure to a temperature change.

As the pyroelectric element is subjected to the temperature change, the pyroelectric element generates a voltage, which produces a current along a coupled current path element, which when coupled to the coil produces a magnetic field flux, wherein the magnetic flux generated by the coil is then detected and measured by the pickup. The pickup is generally disposed in the vicinity of the coil, and the pickup is configured to electromagnetically couple with and detect the magnetic field generated by the coil.

In another example embodiment, a method for wireless temperature sensing can be implemented. Such a method can include steps or operations such as, for example, disposing a pyroelectric element, configured to generate a voltage when subjected to a temperature change, in a selected environment; electrically coupling a coil to the pyroelectric element, the coil configured to generate a magnetic field in response to a current induced by the voltage generated by the pyroelectric element; disposing a pickup configured to electromagnetically couple with and detect the magnetic field generated by the coil in the vicinity of the coil; and providing an output from the pickup corresponding to the detected magnetic field. In another example embodiment, such a method can further include a step or operation for correlating the output corresponding to the detected magnetic field to a temperature parameter.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like, or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention provide for self-powered, active, low cost, wireless, high-temperature sensing techniques. The term "active," with respect to the disclosed sensing techniques, refers to a sensor property wherein the sensor itself generates a current in response to a temperature stimulus (e.g., heat) without a need for additional energy input to the sensor. For embodiments of the invention, simply exposing the sensor to high temperature, for example, will result in production of a current from the sensor. Thus, such a sensor is self-powered. In comparison, conventional "passive" sensors require some type of energy input (other than exposure to a temperature change) to produce a signal output. An example of a passive sensor is a passive RFID sensor, which requires input radio wave interrogation for operation.

Figure 1:
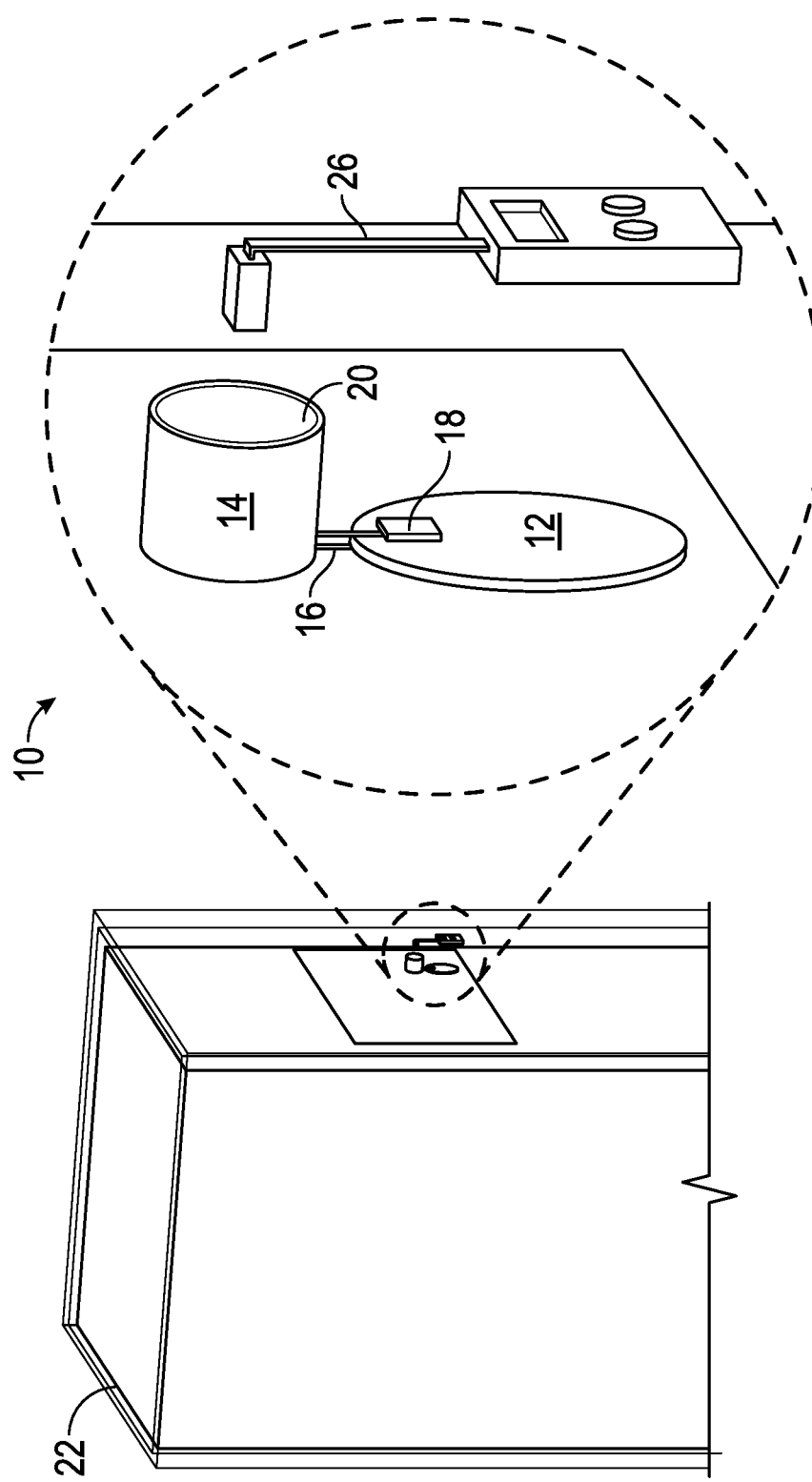
FIG. 1 illustrates a schematic drawing of an exemplary system implementation for wireless temperature sensing according to an example embodiment.

FIG. 1 illustrates an exemplary system 10 for wireless temperature sensing in accordance with the invention. A pyroelectric element 12 is used as a sensor. The sensor element 12 may be formed of Lithium Niobate (LiNbO3) pyroelectric ceramic. Pyroelectric materials generate voltage when subjected to a temperature change. The greater the temperature, the greater the voltage produced. This pyroelectric effect differs from the piezoelectric effect and from thermoelectricity. Pyroelectricity is the ability of a material to generate a voltage when it is heated or cooled. The change in temperature alters the crystal structure at an atomic level, resulting in a change to the material's polarization. This polarization change produces a voltage across the crystal. Piezoelectricity is the electric charge that is produced by certain materials when a physical pressure is applied to such materials. Thermoelectrics use the principle of the Seebeck effect to convert a temperature difference to an electric voltage. Conventional thermocouples utilize wires of dissimilar metals joined together at one end, called the measurement or "hot" junction. At the other end, where the wires are not joined, a connection is typically made to signal conditioning circuitry. This junction between the thermocouple metals and the conditioning circuitry point is called the reference or "cold" junction. The voltage produced at the cold junction depends on the temperatures at both the hot junction and the cold junction. The cold junction temperature must be known to attain an accurate absolute temperature reading. LiNbO3 ceramics are further described in: Md Rashedul H. Sarker et al., *Temperature measurements using a lithium niobate (LiNbO3) pyroelectric ceramic, Measurement, Journal of the International Measurement Confederation*, Vol. 75, (November 2015), pp. 104-110, which is incorporated herein by reference in its entirety. A copy of this article was included as Appendix A of U.S. Provisional Patent Application Ser. No. 62/322,207, which is incorporated herein by reference in its entirety. The inventors of the present invention are co-authors of the aforementioned article.

As described in the article cited above, generated current (I) through a homogenous pyroelectric material with temperature T at any time (t) can be defined as:

$$I = \frac{dQ}{dt} = -pA\frac{dT}{dt}. \qquad \text{(Equation 1)}$$

In Equation (1) above, the variable Q is a charge generated due to temperature change, P is the pyroelectric coefficient of the material, A is the surface area of the electrode and $$\frac{dT}{dt}$$

is the rate of temperature change of the material. By integrating Equation (1) for a certain period of time, the generated charge can be found as follows:

$$Q = \int_{t_i}^{t_f} I\,dt = \int_{t_i}^{t_f} -pA\frac{dT}{dt}dt = \int_{T_i}^{T_f} -pA\,dT = -pA(T_f - T_i) \qquad \text{(Equation 2)}$$

In Equation (2) above, the subscripts i and f refer to the initial or start time of the certain period of time and the final or end time of the certain period of time, respectively. Equation (2) shows that the generated charge Q depends on the temperature difference between the initial and final temperature, not the rate of temperature change. This permits measurement of absolute temperature rather than relative temperature, given that $T_i$ is known (in general, $T_i$ will be ambient temperature or another discerned temperature). An advantage of pyroelectric elements 12, compared to conventional thermoelectric and piezoelectric materials, is their ability to sustain very high temperatures (e.g., in the range to approximately 1200° Celsius) while maintaining the pyroelectric property described above.

Referring again to FIG. 1, the LiNbO3 ceramic sensor element 12 of this embodiment is configured with electrodes 18 formed on the top and bottom surfaces thereof (e.g., one electrode 18 on each of the top and bottom surfaces). FIG. 1 shows the top surface of sensor element 12 as a flat, circular surface; the bottom surface of sensor element 12 faces the wall of a housing 22, and hence the bottom surface and the electrode 18 formed thereon are not visible in the figure. Other shapes or configurations of element 12 are possible. The electrodes 18 may be formed of an electrically conductive coating designed to withstand high temperatures (e.g., high purity silver paint). One of ordinary skill in the art will appreciate that the electrodes 18 can be formed by various techniques, e.g., layer deposition.

The electrodes 18 provide the electrical junction point between the pyroelectric element 12 and one end of an element 16 providing a current path. In some embodiments, the current path element 16 comprises an electrically conductive wire. One type of wire that can be used is a ceramic coated wire produced by manufacturer Ceramawire. The current path element 16 may be formed using other materials as known in the art (e.g., conductive tape, conductive layer deposition, etc.), with appropriate sheathing or coatings applied to protect the element within the environment of use. The ends of the conductive path element 16 can be electrically connected to the electrodes 18 using an electrically conductive adhesive designed to withstand high temperatures. One type of adhesive that may be used is Pyro-Duct™ 597-A. PYRO-DUCT is a trademark of Aremco Products Inc. One of ordinary skill in the art will appreciate that the element 16 ends can be coupled to the electrodes 18 via other known conventional means. The temperature of the pyroelectric element 12 can be calculated as:

$$T_f = -\frac{1}{pA}\int_{t_i}^{t_f} I dt + T_i \qquad \text{(Equation 3)}$$

In Equation (3) (which is derived from Equation (2) above), $T_i$ is the initial temperature, which may be considered as room temperature (or another discerned temperature) at time $t_i$ and $T_f$ is the final temperature of the element 12 at time $t_f$. By identifying the initial temperature ($T_i$), pyroelectric element coefficient (p), area of the electrode 18 (A), and the total amount of current generated by the element 12 within the certain period of time ($t_i$ to $t_f$), the final temperature of the element ($T_f$) at any time can be calculated. To calculate the total amount of current, (area under the current profile, $$\int_{t_i}^{t_f} I dt \bigg),$$

numerical integration with Simpson's one-third rule can be applied.

As shown in FIG. 1, a winding coil 14 can be coupled to the other end of the current path element 16, in accordance with an example embodiment. The winding coil 14 can constitute magnetic wire wound in a loop configuration to produce a magnetic field when a current is applied (as further described below). One type of wire that may be used is Nickel clad HT magnetic wire (N-24 Ceramawire #24 AWG) produced by manufacturer Ceramawire. The coil 14 may be packaged or housed within a ceramic material or other suitable material to protect the coil wire from extreme temperatures. In some example embodiments, the coil 14 may be configured with a core 20 to amplify the magnetic field produced (e.g., a Permalloy magnetic material core). One type of core that may be used to implement embodiments of the invention is a Permalloy alloy comprising 80% Ni, 15.5% Fe, 4.5% Mo, annealed, 1 inch (0.024 m) diameter and 2 inch (0.05 m) length, initial permeability 50,000, maximum permeability 250,000.

FIG. 1 illustrates the pyroelectric element 12 and the coil 14 disposed on a housing 22, e.g., of a structure or machine in which heat is generated. This exemplary embodiment illustrates one of the many implementations possible with the invention. One of ordinary skill in the art will appreciate that embodiments described herein can be implemented in an unlimited number of configurations to sense temperature parameters, for example, pyroelectric element 12 may be disposed in the interior of a structure or environment or exterior thereto, for example, on a wall or housing thereof (e.g., within exhaust manifolds, combustion chambers, chimney stacks, etc., or affixed to temperature-sensitive components, etc.). For example, an embodiment of FIG. 1 may be implemented wherein the housing 22 is the enclosure of a furnace. In such an embodiment, the winding coil 14 may be disposed a short distance from the pyroelectric element 12, where the coil 14 is exposed to the same environment as the pyroelectric element 12.

Figure 2:
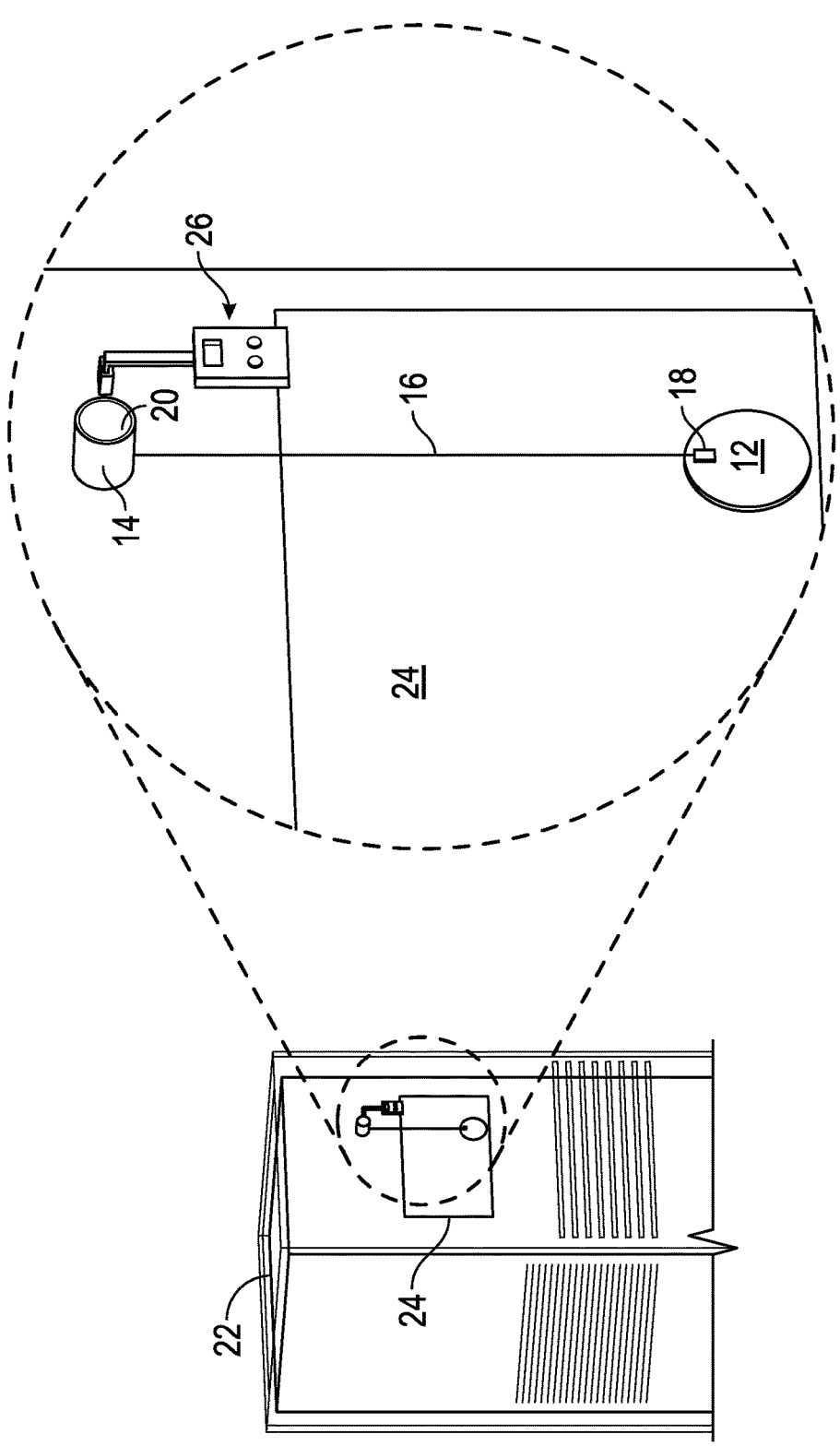
FIG. 2 illustrates a schematic drawing of another exemplary system implementation for wireless temperature sensing in accordance with an example embodiment.

Placement of the coil 14 is dependent on the operational ability of the coil 14 within the desired environment. For example, if the environment temperature is expected to exceed the melting temperature of the coil 14 and core 20, the coil package may be placed at a distance away from the pyroelectric element 12 to avoid exposing the coil 14/core 20 to such conditions. For example, FIG. 2 shows a configuration of an embodiment wherein the housing 22 includes a high-temperature portion 24 in the vicinity of a high-temperature region of the interior of the housing 22. In this embodiment, the coil 14 is disposed away from the high-temperature portion 24, at a distance from the pyroelectric element 12.

Another consideration for placement of the coil 14 is the mounting surroundings. Placement of the coil 14 within or near a magnetic material may interfere with or corrupt the magnetic field produced by the coil 14, for example, if the walls of the housing 22 in FIGS. 1-2 are made of a magnetic material. In such cases, modification of the coil 14 package or placement of appropriate magnetic insulating materials as known in the art may be used to avoid interference of the coil magnetic field.

Returning to FIG. 1, a pickup 26 can be positioned in proximity to the winding coil 14 to detect the magnetic field generated by the coil 14. In some example embodiments, the pickup 26 can be a Gauss meter positioned in proximity to the coil 14 such that the magnetic field produced by the coil is detected via electromagnetic coupling with the Gauss meter's coupler. The current induced in the Gauss meter coupler can be processed by the meter circuitry to output a readout indicative of the magnitude of the detected magnetic field. One type of Gauss meter that may be used to implement an example embodiment is a DC milligaussmeter, analog voltage output (±2V)=±2 Gauss=±2000 milligauss, DC voltage output at 3 Hz to 300 Hz, resolution: 0.01 milligauss.

One of ordinary skill in the art will appreciate that other devices capable of detecting and measuring a magnetic field may be used in other example embodiments (e.g., Hall effect sensor, conventional induction coils, etc.). In some example embodiments and applications, a Gauss meter may be advantageous by virtue of its ability to detect magnetic fields of small magnitudes.

With example embodiments, as the pyroelectric element 12 is subjected to a temperature change, the element generates a voltage which produces a current along the coupled current path element 16, which when coupled to the coil 14 produces a magnetic field flux. The magnetic flux generated by the coil 14 is then detected and measured by the pickup 26. The magnetic flux density describes the intensity of the magnetic field at a particular point in space and can be computed:

$$\varphi = \frac{\mu_0 NIA}{w} \quad \text{(Equation 4)}$$

In Equation (4), the cross sectional area (A) of the coil 14 loop, coil length (w), number of loops (N), and current (I) are some of the factors that affect the magnetic flux density produced. The magnetic field at a given distance in the z-axis can be approximated as:

$$B_z = \frac{\mu_0 NI}{2w} \left\{ \frac{1 - \frac{2z}{w}}{\left[\left(\frac{2r}{w}\right)^2 + \left(\frac{2r}{w} - 1\right)^2\right]^{\frac{1}{2}}} + \frac{1 + \frac{2z}{w}}{\left[\left(\frac{2r}{w}\right)^2 + \left(\frac{2z}{w} + 1\right)^2\right]^{\frac{1}{2}}} \right\} \quad \text{(Equation 5)}$$

In Equation (5), z is any point on the z-axis away from the center of the current-carrying conductor (coil 14), r is the radius of the coil, and w is the length of the coil. Further explanation regarding magnetic field and flux and its relationship to current may be found in: N. D. Love et al., *Self-powered wireless thermoelectric sensors, Measurement, Journal of the International Measurement Confederation*, Vol. 45, (January 2014), pp. 26-32, which was included in Appendix B of U.S. Provisional Patent Application Ser. No. 62/322,207, which is incorporated herein by reference in its entirety.

Since the voltage generated by the pyroelectric element 12 is proportional to its exposure to temperature change, as the temperature increases, for example, its voltage output rises producing a corresponding change in the current passing to the coil 14 via the electrodes 18 and current path element 16, which affects the strength of the magnetic field produced by the coil, which in turn affects the strength of the electromagnetic coupling between the coil and the pickup 26, thereby providing an output signal indicative of the temperature of the pyroelectric element 12. In this manner, a real-time absolute temperature measurement can be obtained of the environment in which the element 12 is disposed or of the object to which the element 12 is affixed.

The output signal from the pickup 26 can be processed in a number of ways to correlate the detected magnetic field to the temperature of the pyroelectric element 12. For example, one of ordinary skill in the art can produce a simple routine or instructions for compilation using conventional software applications to provide a temperature readout on a display. Such a routine or set of instructions can be implemented in the contents of a module such as module 452, which is depicted and described herein with respect to FIG. 6. An initial temperature reading can be obtained using the pyroelectric element 12 as disclosed herein and subsequent temperature changes can be monitored thereafter. In implementations where monitoring of temperature changes is not the objective, such as when the objective is solely to detect when the environment, or a component, exceeds a critical temperature, a simplified program can be produced to trigger a warning signal when the pickup 26 detects a magnetic field magnitude matching a preset magnitude parameter correlated to the critical temperature. One of ordinary skill in the art will appreciate that embodiments of the invention may be implemented by programming a suitable general-purpose computer or in some example embodiments, with a special-purpose computer. An example of a general-purpose computer or a special-purpose computer is shown as data-processing system 400 in FIG. 5. The programming may be accomplished through the use of one or more conventional program storage devices readable by the computer processor (e.g., such as processor 341 depicted in FIG. 5) and encoding one or more programs of instructions executable by the computer for performing the operations described herein. The precise forms of the program storage device and of the encoding of instructions are immaterial here.

Figure 3:
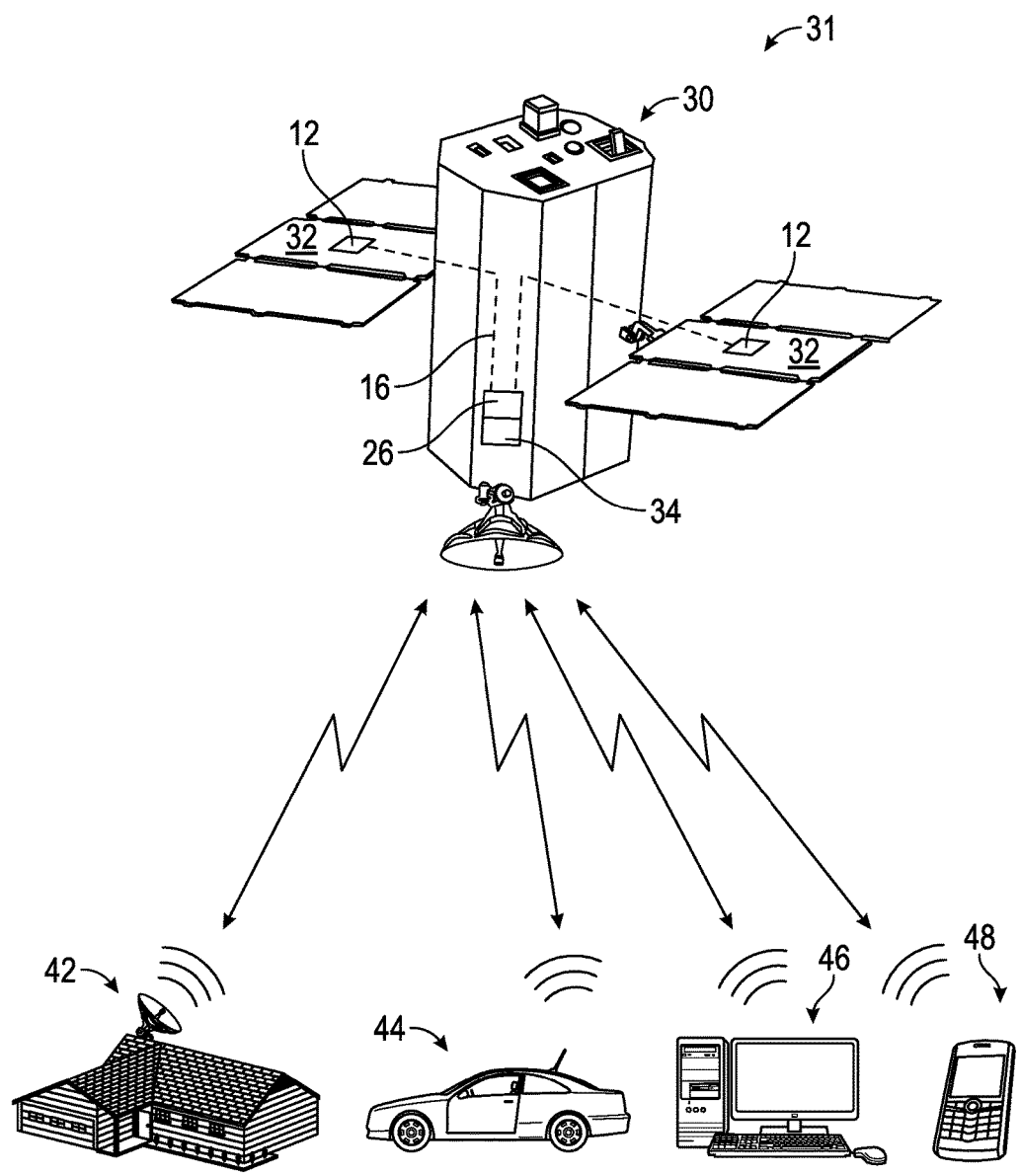
FIG. 3 illustrates a schematic drawing of another exemplary system implementation for wireless temperature sensing in accordance with an example embodiment.

FIG. 3 illustrates a schematic diagram of a system 31, which can be implemented in accordance with an example embodiment. As shown in FIG. 3, the system 31 includes an orbiting satellite 30 that can be configured with pyroelectric elements 12 disposed on its solar panels 32. The elements 12 can be linked to a pickup 26 housed within the satellite for detection of the respective magnetic field magnitudes as described herein. The example system 31 depicted in FIG. 3 may be configured with the electrodes 18 and coil 14 arrangement as described with respect to the example embodiments of FIG. 1 or 2; these components are not shown in FIG. 3 for clarity of the illustration. The pickup 26 can be linked to a satellite transmitter 34 to wirelessly transmit the detected signal data to a desired receiver such as, for example, a control office 42, a vehicle 44, a computer 46, or a portable computing device 48 such as a handheld smartphone, a tablet computing device, and so on. Such an implementation can provide real-time detection of the respective panel 32 temperature providing the user the ability to make rapid panel positioning adjustments. As will be understood by one of ordinary skill in the art, long-distance remote wireless temperature sensing/conveying as illustrated in FIG. 3 could also be implemented for applications other than satellite-to-earth scenarios, e.g., in entirely terrestrial scenarios.

As described herein, a signal (e.g., magnetic field strength or the like) indicative of the temperature of pyroelectric element 12 (and hence of the temperature of its environment) may be wirelessly conveyed from pyroelectric element 12 to pickup 26 located a distance away from pyroelectric element 12. Thus, the temperature of a sensor or sensed object can be wirelessly detected at a distance from the sensor or sensed object. Further, pickup 26 may process the received signal and generate a further signal indicative of the same temperature. As described with reference to FIG. 3, for example, the further signal generated by pickup 26 may be transmitted, e.g., wirelessly, to a very remote receiver. Thus, the temperature of a sensor or sensed object can be wirelessly detected at very great distances from the sensor or sensed object.

Figure 4:
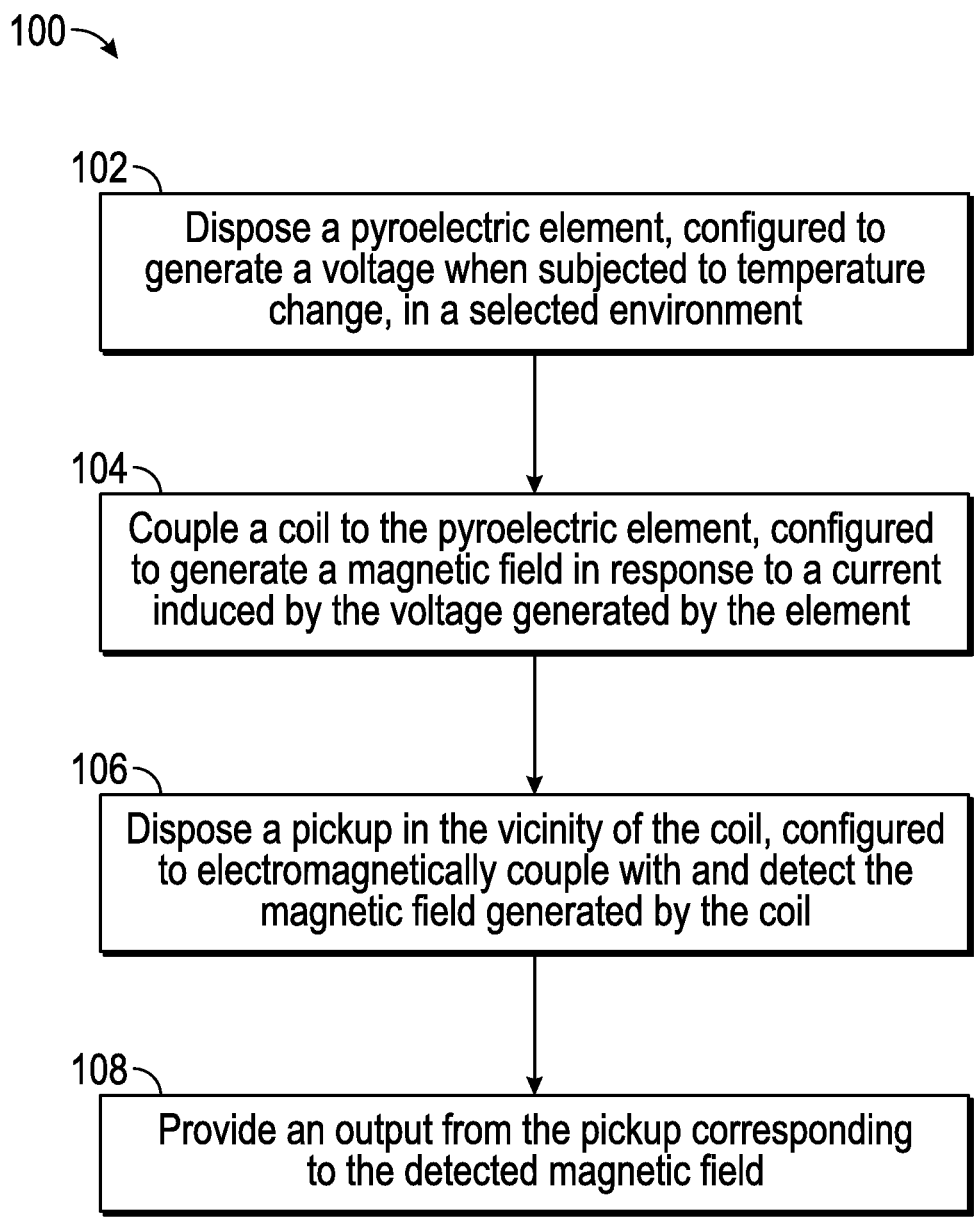
FIG. 4 illustrates a flow chart of operations illustrating logical operational steps of a method for wireless temperature sensing according to an example embodiment.

FIG. 4 illustrates a flow chart depicting logical operations or steps of a method 100 for wireless temperature sensing, in accordance with an example embodiment. As indicated at a first step as shown in block 102, a pyroelectric element, configured to generate a voltage when subjected to a temperature change, can be disposed in a selected environment. As indicated thereafter at a second step as depicted in block 104, a coil can be electrically coupled to the pyroelectric element; the coil being configured to generate a magnetic field proportional to a current induced by the voltage generated by the pyroelectric element. As illustrated at a third step shown in block 106, a pickup can be disposed in the vicinity of the coil; the pickup being configured to electromagnetically couple with and detect the magnetic field generated by the coil. Thereafter, as shown at a fourth step in block 108, an output can be provided from the pickup corresponding to the detected magnetic field.

Based on the foregoing, it can be appreciated that temperature is one of the most important thermodynamic properties measured and controlled in energy generation systems. To operate the energy system at optimum operating conditions for lower emission and higher efficiency, it is important to measure real time temperatures. Furthermore, temperature sensing in intense environments is necessary since most sensors in energy systems get exposed to elevated temperatures, corrosive environments, and elevated pressures. One of the solutions for developing harsh environment sensors is to use ceramic materials, especially functional ceramics such as pyroelectrics. Pyroelectric ceramics can be used to develop active sensors for both temperature and pressure due to their capabilities in coupling energy among mechanical, thermal, and electrical domains. Additionally, Lithium niobate ($LiNbO_3$) pyroelectric ceramic material can be used to develop a temperature sensor for high temperature applications. $LiNbO_3$ has a high Curie temperature (1210° C.), which makes it promising to be used as sensing materials for high temperature applications.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
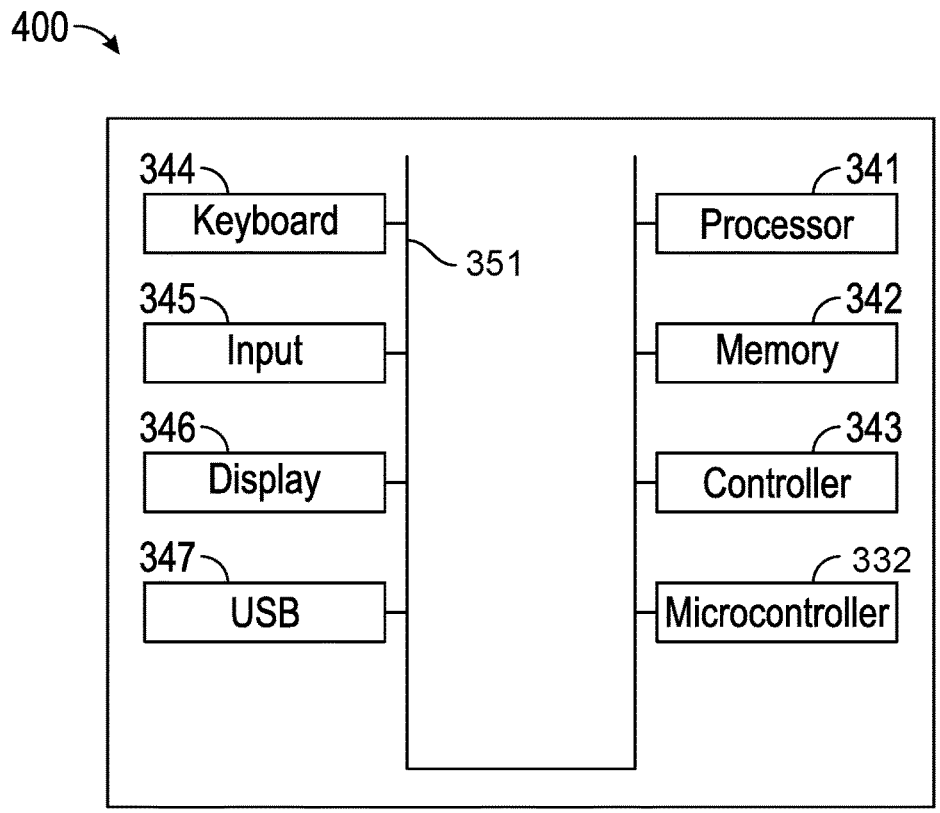
FIG. 5 illustrates a schematic view of a computer system, which can be adapted for use in accordance with an example embodiment.
Figure 6:
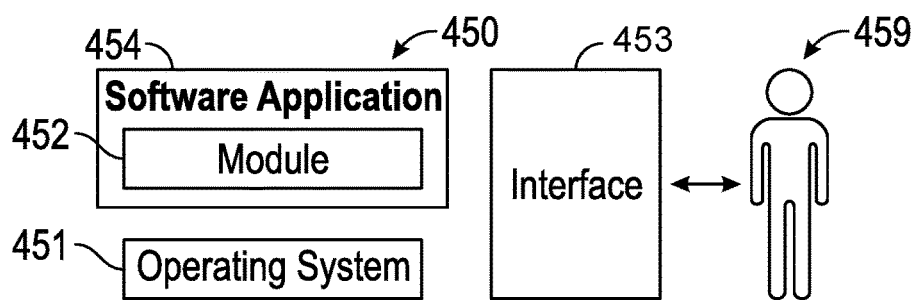
FIG. 6 illustrates a schematic view of a software system including a module, an operating system, and a user interface, which can be utilized in in accordance with an example embodiment.

FIGS. 5-6 are shown only as exemplary diagrams of data-processing environments in which example embodiments may be implemented. It should be appreciated that FIGS. 5-6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, some embodiments may be implemented in the context of a data-processing system 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc.).

FIG. 6 illustrates a computer software system 450 for directing the operation of the data-processing system 400 depicted in FIG. 5. Software application 454, stored for example in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein with respect to FIGS. 1-4

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 5-6 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, or otherwise altered. Similarly, this disclosure describes one or more embodiments wherein various operations are performed by certain systems, applications, module, components, etc. In alternative embodiments, however, those operations could be performed by different components. Also, items such as applications, module, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware, and hardware, or any combination of any two of software, firmware, and hardware. The term "processor" may refer to one or more processors.

It may be understood that particular embodiments described herein are shown by way of illustration and not as limitations of such embodiments. The principal features of the disclosed embodiments can be employed in various embodiments without departing from the scope of such embodiments. Those skilled in the art will recognize, or be able to ascertain using no more than routine experimentation, numerous equivalents to the specific procedures described herein. Such equivalents are considered to be within the scope of the disclosed embodiments and are covered by the claims.

All publications, patents, and patent applications mentioned in the specification are indicative of the level of skill of those skilled in the art to which this invention pertains. All publications, patents, and patent applications are herein incorporated by reference to the same extent as if each individual publication, patent, or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements, or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of the disclosed embodiments have been described in terms of preferred embodiments, it may be apparent to those skilled in the art that variations may be applied to the compositions and/or methods and in the steps or in the sequence of steps of the method described herein without departing from the concept, spirit, and scope of the disclosed embodiments. All such similar substitutes and modifications apparent to those skilled in the art are deemed to be within the spirit, scope, and concept of the disclosed embodiments as defined by the appended claims.

Based on the foregoing, it can be appreciated that a number of example embodiments are disclosed herein. For example, in one embodiment, a wireless temperature sensor system can be implemented, which includes a pyroelectric element configured to generate a voltage when subjected to a temperature change; a coil electrically coupled to the pyroelectric element and configured to generate a magnetic field in response to a current induced by the voltage generated by the pyroelectric element; and a pickup configured to electromagnetically couple with and detect the magnetic field generated by the coil, wherein the pickup is configured to provide an output corresponding to the detected magnetic field.

In some example embodiments, the aforementioned coil can be configured with or may include a magnetic metal core. Additionally, in some example embodiments, a processor can be configured to correlate the output corresponding to the detected magnetic field to a temperature parameter indicative of a temperature of the pyroelectric element. In other example embodiments, the aforementioned pyroelectric element can comprise a Lithium Niobate (LiNbO3) pyroelectric ceramic.

The voltage generated by the pyroelectric element is proportional to its exposure to a temperature change. In addition, the pyroelectric element is subjected to the temperature change, the pyroelectric element generates a voltage, which produces a current along a coupled current path element, which when coupled to the coil produces a magnetic field flux, wherein the magnetic flux generated by the coil is then detected and measured by the pickup.

In some example embodiments, the aforementioned pickup can be disposed in a vicinity of the coil, wherein the pickup is configured to electromagnetically couple with and detect the magnetic field generated by the coil.

In another example embodiment, a method for wireless temperature sensing can include steps or operations such as, for example: disposing a pyroelectric element, configured to generate a voltage when subjected to a temperature change, in a selected environment; electrically coupling a coil to the pyroelectric element, the coil configured to generate a magnetic field in response to a current induced by the voltage generated by the pyroelectric element; disposing a pickup, configured to electromagnetically couple with and detect the magnetic field generated by the coil, in the vicinity of the coil; and providing an output from the pickup corresponding to the detected magnetic field.

It will be appreciated that variations of the above-disclosed and other features and functions, or alternatives thereof, may be desirably combined into many other different systems or applications. It will also be appreciated that various presently unforeseen or unanticipated alternatives, modifications, variations, or improvements therein may be subsequently made by those skilled in the art, which are also intended to be encompassed by the following claims.

What is claimed is:

1. A wireless temperature sensor system, comprising:
   a pyroelectric element configured to generate a voltage when subjected to a temperature change;

a coil electrically coupled to said pyroelectric element and configured to generate a magnetic field in response to a current induced by said voltage generated by said pyroelectric element;

a pickup configured to electromagnetically couple with and detect said magnetic field generated by the coil, wherein said pickup is configured to provide an output corresponding to said detected magnetic field; and a processor configured to correlate said output corresponding to said detected magnetic field to a temperature parameter indicative of a temperature of said pyroelectric element.

2. The system of claim 1 wherein said coil is configured with a magnetic metal core.

3. The system of claim 1 wherein said pyroelectric element comprises a Lithium Niobate (LiNbO3) pyroelectric ceramic.

4. The system of claim 1 wherein said voltage generated by said pyroelectric element is proportional to its exposure to a temperature change.

5. The system of claim 4 wherein said pyroelectric element is configured to generate a voltage when subjected to said temperature change to produce a current along a coupled current path element that is configured to produce a magnetic field flux when coupled to said coil, wherein said pickup is configured to detect and measure said magnetic flux generated by said coil.

6. The system of claim 1 wherein said pickup is disposed in a vicinity of said coil, and wherein said pickup is configured to electromagnetically couple with and detect said magnetic field generated by said coil.

7. A wireless temperature sensor system, comprising:
a pyroelectric element configured to generate a voltage when subjected to a temperature change;
a coil that is configured with a magnetic metal core, wherein said coil is electrically coupled to said pyroelectric element and configured to generate a magnetic field in response to a current induced by said voltage generated by said pyroelectric element;
a pickup disposed in a vicinity of said coil, wherein said coil is configured to electromagnetically couple with and detect said magnetic field generated by the coil, wherein said pickup is configured to provide an output corresponding to said detected magnetic field; and
a processor configured to correlate said output corresponding to said detected magnetic field to a temperature parameter indicative of a temperature of said pyroelectric element.

8. The system of claim 7 wherein said pyroelectric element comprises a Lithium Niobate (LiNbO3) pyroelectric ceramic.

9. The system of claim 7 wherein said voltage generated by said pyroelectric element is proportional to its exposure to a temperature change.

10. The system of claim 9 wherein said pyroelectric element is configured to generate a voltage when subjected to said temperature change to produce a current along a coupled current path element that is configured to produce a magnetic field flux when coupled to said coil, wherein said pickup is configured to detect and measure said magnetic flux generated by said coil.

11. A method for wireless temperature sensing, comprising:
disposing a pyroelectric element, configured to generate a voltage when subjected to a temperature change, in a selected environment;
electrically coupling a coil to the pyroelectric element, the coil configured to generate a magnetic field in response to a current induced by the voltage generated by the pyroelectric element;
disposing a pickup, configured to electromagnetically couple with and detect the magnetic field generated by the coil, in the vicinity of the coil;
providing an output from the pickup corresponding to the detected magnetic field; and
correlating with a processor said output corresponding to said detected magnetic field to a temperature parameter indicative of a temperature of said pyroelectric element.

12. The method of claim 11 further comprising correlating the output corresponding to the detected magnetic field to a temperature parameter.

13. The method of claim 11 wherein said pyroelectric element comprises a Lithium Niobate (LiNbO3) pyroelectric ceramic.

14. The method of claim 11 wherein said coil is configured with a magnetic metal core.

15. The method of claim 11 wherein said voltage generated by said pyroelectric element is proportional to its exposure to a temperature change.

16. The method of claim 15 wherein said pyroelectric element is subjected to said temperature change, said pyroelectric element generates a voltage, which produces a current along a coupled current path element, which when coupled to said coil produces a magnetic field flux, wherein said magnetic flux generated by said coil is then detected and measured by said pickup.

17. The method of claim 11 wherein said pickup is disposed in a vicinity of said coil, wherein said pickup is configured to electromagnetically couple with and detect said magnetic field generated by said coil.

\* \* \* \* \*